(12) United States Patent
Ishino et al.

(10) Patent No.: US 8,616,366 B2
(45) Date of Patent: Dec. 31, 2013

(54) FOOD AND DRINK CONVEYING DEVICE

(75) Inventors: Haruki Ishino, Kanazawa (JP); Shintaro Sasahara, Kanazawa (JP)

(73) Assignee: Ishino Seisakusyo Co., Ltd., Kanazawa-shi (JP)

( * ) Notice: Subject to any disclaimer, the term of this patent is extended or adjusted under 35 U.S.C. 154(b) by 1 day.

(21) Appl. No.: 13/387,801

(22) PCT Filed: Jul. 22, 2010

(86) PCT No.: PCT/JP2010/062368
§ 371 (c)(1),
(2), (4) Date: Apr. 5, 2012

(87) PCT Pub. No.: WO2011/013574
PCT Pub. Date: Feb. 3, 2011

(65) Prior Publication Data
US 2012/0186948 A1 Jul. 26, 2012

(30) Foreign Application Priority Data

Jul. 31, 2009 (JP) ................................. 2009-179436

(51) Int. Cl.
*B65G 15/60* (2006.01)
(52) U.S. Cl.
USPC ...................... 198/805; 414/797.1; 198/690.1

(58) Field of Classification Search
USPC ........... 198/690.1, 805, 831, 850, 853, 860.3; 414/3, 797.1
See application file for complete search history.

(56) References Cited

U.S. PATENT DOCUMENTS 7,400,075 B2 * 7/2008 Park .............................. 310/103
2012/0031741 A1 2/2012 Ishino et al.

FOREIGN PATENT DOCUMENTS

| JP | 11-208859 A | 8/1989 |
| JP | 2004-16464 A | 4/2004 |
| WO | 2010/082513 A1 | 7/2010 |

\* cited by examiner

*Primary Examiner* — Gene Crawford
*Assistant Examiner* — Lester Rushin
(74) *Attorney, Agent, or Firm* — Chapman and Cutler LLP

(57) ABSTRACT

An object of the invention is to provide a food and drink conveying device that can allow a travel body to travel stably over a travel path. A food and drink conveying device (1) can allow a travel body (7) to travel over a travel path (1a) using a magnetic force between a first magnetic body (18) and a second magnetic body (19) by driving a conveyor driving body (15) and is provided with a lift preventing means (34) in close proximity to the second magnetic body (19), where the lift preventing means (34) makes contact with the travel path (1a) so as to prevent the second magnetic body (19) from lifting due to the magnetic force between the first magnetic body and the second magnetic body (19) and moves together with the conveyor driving body (15).

9 Claims, 13 Drawing Sheets

FOOD AND DRINK CONVEYING DEVICE

TECHNICAL FIELD

The present invention relates to a food and drink conveying device that allows a travel body to travel over a travel path using a magnetic force between a first magnetic body and a second magnetic body when a conveyor driving body is driven.

BACKGROUND ART

Conventional food and drink conveying devices have a continuously running chain (conveyor driving body) when a driving motor, not shown, is driven; an ordered item conveying path (travel path) for conveying food or drink, such as sushi, from a kitchen to a customer; and a tray (travel body) with rollers that travels over the flat travel surface of the conveying path and carries a food or drink dish on which sushi is placed on top. These food and drink conveying devices have a first magnetic body with magnetism beneath the tray, and at the same time, the chain is provided with a number of second magnetic bodies having magnetism with opposite polarity to the first magnetic body at constant intervals so that the tray can travel over the conveying path using a magnetic force between the first magnetic body and the second magnetic bodies (see Patent Document 1).

PRIOR ART DOCUMENT

Patent Document

Patent Document 1: Japanese Unexamined Patent Publication 2004-16464 (page 4, FIG. 2)

SUMMARY OF THE INVENTION

Problem to be Solved by the Invention

In the food and drink conveying device in Patent Document 1, when the chain (conveyor driving body) is driven, the second magnetic bodies are lifted up due to the magnetic force between the first magnetic body and the second magnetic bodies, and thus a second magnetic body makes contact with the conveying path and the chain is driven unstably, and therefore such a problem arises that the tray connected to the chain through the first magnetic body travels unstably over the conveying path.

The present invention is provided in order to solve this problem, and an object of the invention is to provide a food and drink conveying device that can allow a travel body to stably travel over a travel path.

Means for Solving Problem

In order to achieve the above-described object, the food and drink conveying device according to the present invention is a food and drink conveying device having; a travel path; a conveyor driving body provided beneath the travel path along the travel path; and a travel body having a first magnetic body underneath which can travel over the above-described travel path with food or drink placed on top, wherein a second magnetic body having a polarity opposite to that of the above-described first magnetic body is connected to the upper portion of the above-described conveyor driving body beneath the above-described travel path with a connection portion provided in between, and the above-described travel body travels over the above-described travel path as a result of the magnetic force between the above-described first magnetic body and the above-described second magnetic body when the above-described conveyor driving body is driven, and is characterized in that a lift preventing means for preventing the above-described second magnetic body from being lifted due to the magnetic force between the above-described first magnetic body and the above-described second magnetic body, which moves together with the above-described conveyor driving body, is provided in the vicinity of the above-described second magnetic body so as to make contact with the above-described travel path.

According to this feature, the lift preventing means makes contact with the travel path so that the second magnetic body can be prevented from being lifted up towards the first magnetic body due to the magnetic force acting between the first magnetic body and the second magnetic body, and therefore the second magnetic body does not make contact with the travel path, thereby preventing friction from being generated between the second magnetic body and the travel path when the conveyor driving body is driven, and thus the travel body can travel stably over the travel path.

The food and drink conveying device according to the present invention is characterized in that the above-described lift preventing means is formed of a pair of rollers which make contact with the above-described travel path and rotate so that the above-described lift preventing means move together with the above-described conveyor driving body, the pair of rollers are aligned in the direction in which the above-described conveyor driving body is driven, and the above-described second magnetic body is provided between the above-described pair of rollers.

According to this feature, the pair of rollers that make contact with the travel path rotate while maintaining contact when the conveyor driving body is driven, and therefore the friction generated between the travel path and the pair of rollers can be kept small. In addition, the second magnetic body is provided between the pair of rollers that are aligned in the direction in which the conveyor driving body is driven, and thus only one of the two ends of the magnetic body that faces the direction in which the conveyor driving body is driven can be prevented from being lifted.

The food and drink conveying device according to the present invention is characterized in that the above-described lift preventing means is formed of a pair of rollers which make contact with the above-described travel path and rotate so that the above-described lift preventing means move together with the above-described conveyor driving body, the pair of rollers are aligned in the direction perpendicular to the direction in which the above-described conveyor driving body is driven, and the above-described second magnetic body is provided between the above-described pair of rollers.

According to this feature, the pair of rollers that make contact with the travel path rotate while maintaining contact when the conveyor driving body is driven, and therefore the friction generated between the travel path and the pair of rollers can be kept small. In addition, the second magnetic body is provided between the pair of rollers that are aligned in the direction perpendicular to the direction in which the conveyor driving body is driven, and thus only one of the two ends of the magnetic body that faces the direction perpendicular to the direction in which the conveyor driving body is driven can be prevented from being lifted.

The food and drink conveying device according to the present invention is characterized in that a support means for supporting the above-described connection portion for connecting the above-described second magnetic body to the above-described conveyor driving body is provided along the above-described travel path.

According to this feature, the load of the second magnetic body and the conveyor driving body is supported by the supporting means with the connection portion in between, and therefore the travel body can travel over the travel path in such a state that the connection between the first magnetic body and the second magnetic body due to the magnetic force is stable.

The food and drink conveying device according to the present invention is characterized in that the above-described first magnetic body is provided to the above-described travel body so as to be movable in the direction perpendicular to the direction in which the above-described travel body travels, and at least either the above-described second magnetic body or the above-described travel path is provided with a movement regulating means for regulating the movement of the above-described second magnetic body in the direction perpendicular to the direction in which the above-described conveyor driving body is driven.

According to this feature, even when the travel body moves in the direction away from the conveyor driving body, the first magnet follows the second magnet so that the connection between the first magnetic body and the second magnetic body due to the magnetic force is maintained without being weakened, and therefore the travel body can travel stably over the travel path.

BEST MODE FOR CARRYING OUT THE INVENTION

The food and drink conveying devices according to the preferred embodiments of the present invention are described below.

First Embodiment

Figure 1:
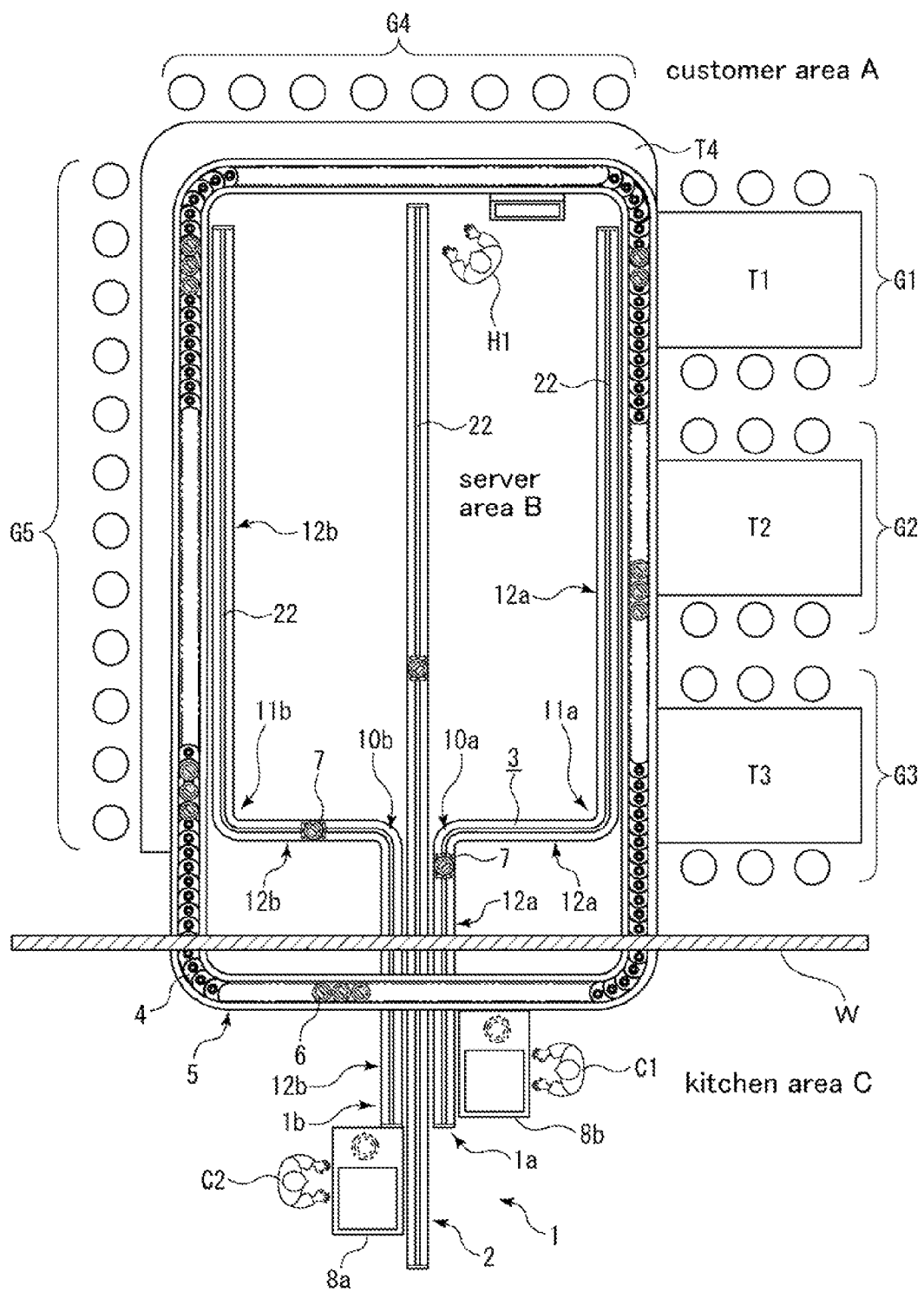
FIG. 1 is a plan diagram showing the entirety of the food and drink conveying device according to the first embodiment.
Figure 3:
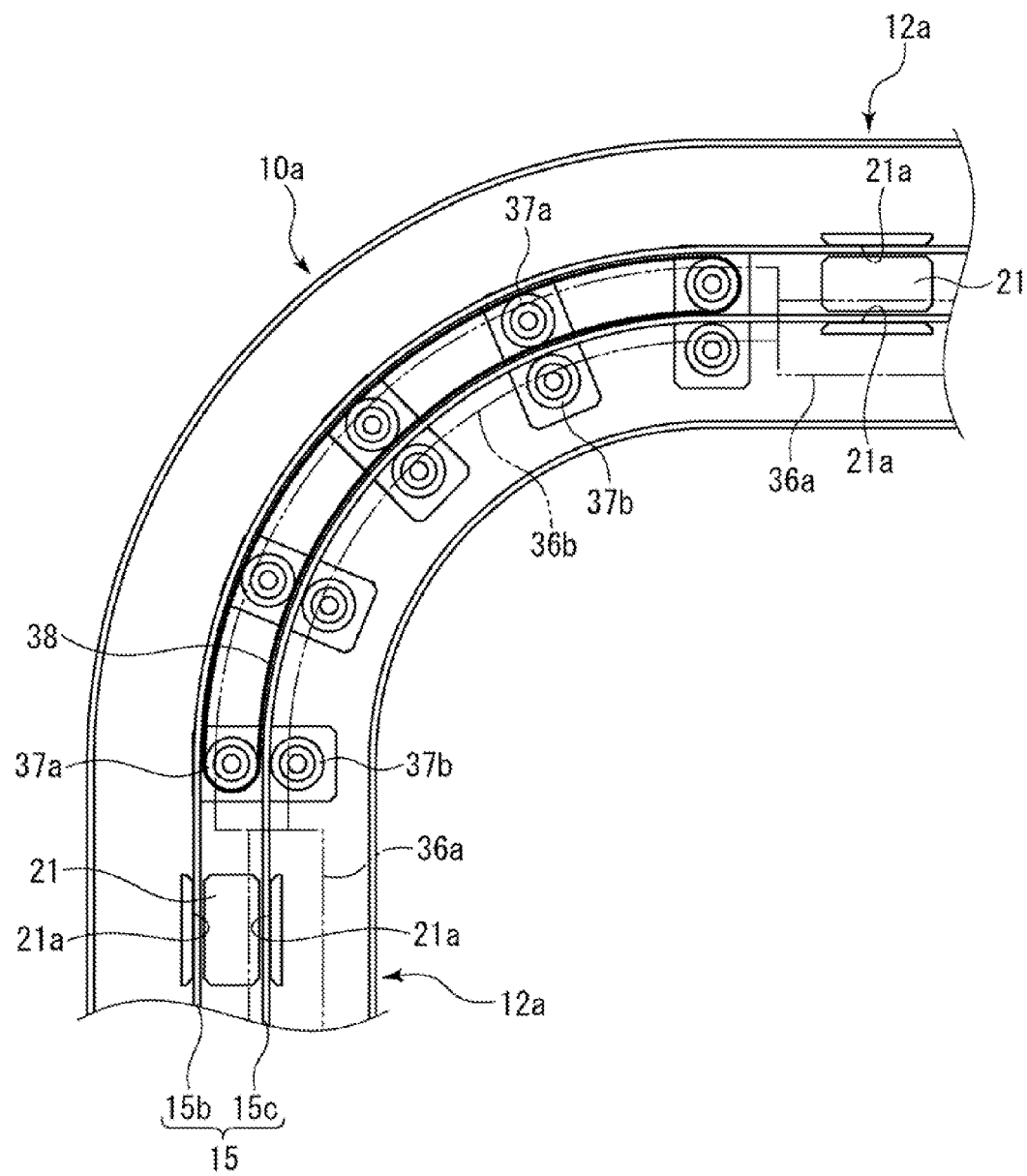
FIG. 3 is a plan diagram showing the first corner without a cover.
Figure 4:
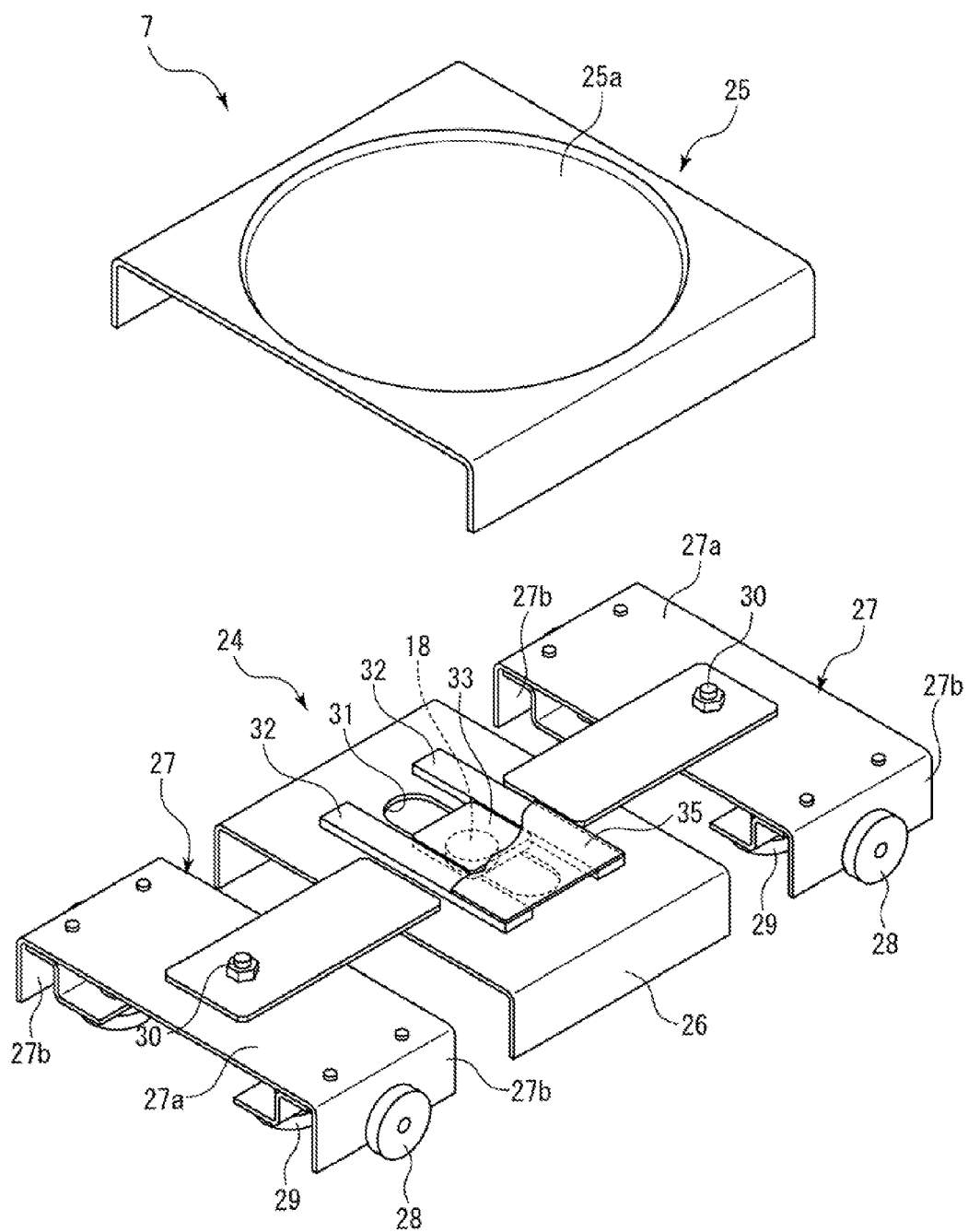
FIG. 4 is an exploded diagram showing a travel body.
Figure 5:
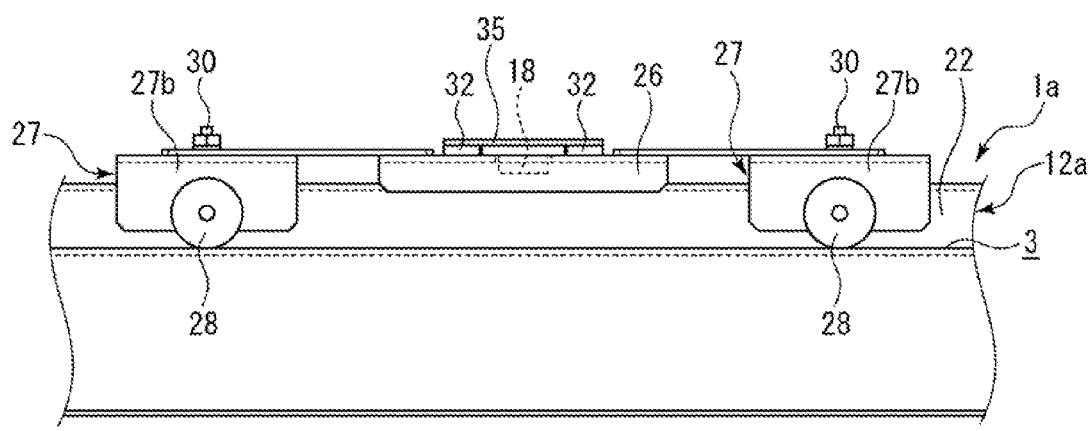
FIG. 5 is a side diagram showing a travel body in a straight path of an ordered item conveying path.
Figure 6:
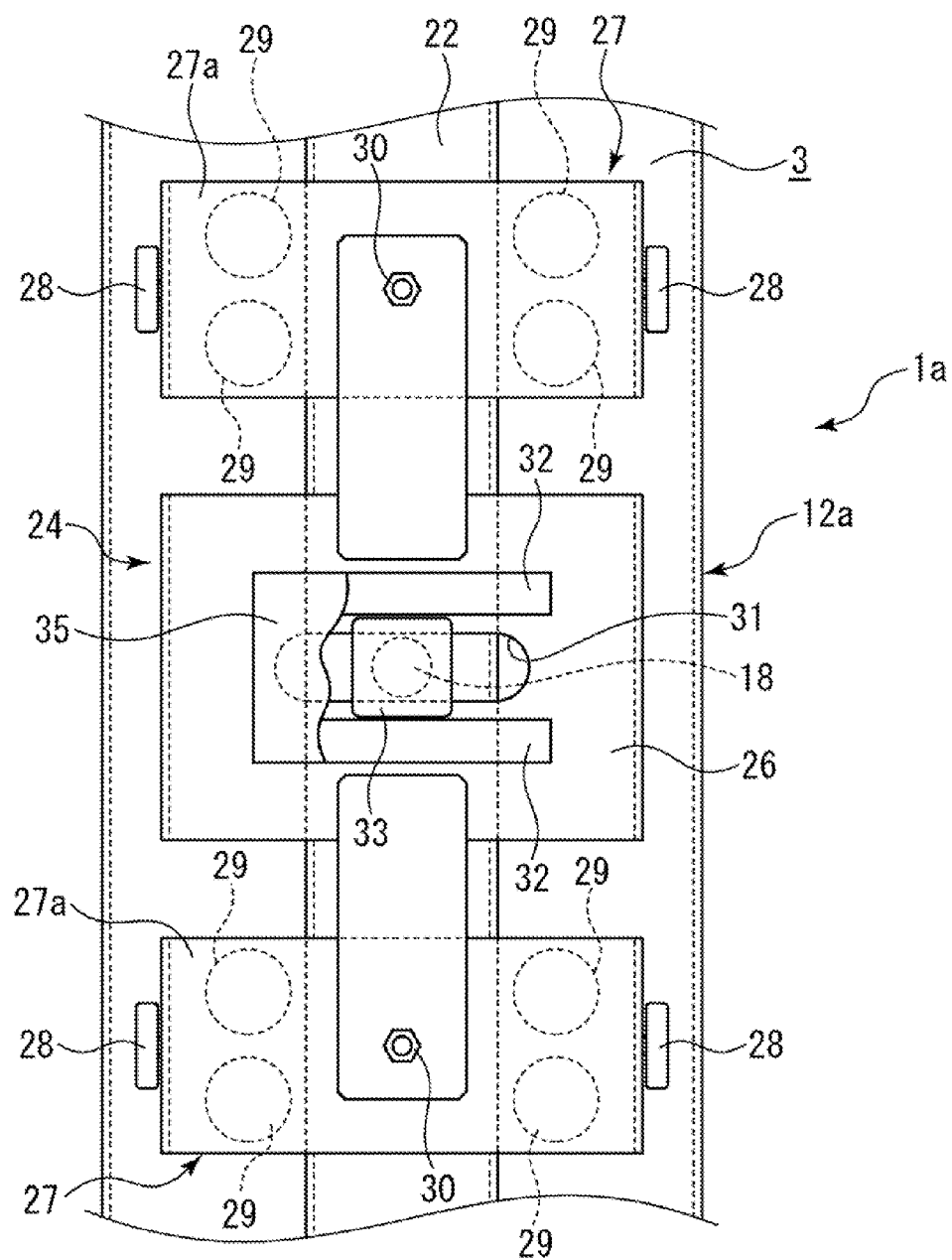
FIG. 6 is a plan diagram showing a travel body in a straight path of an ordered item conveying path.
Figure 7:
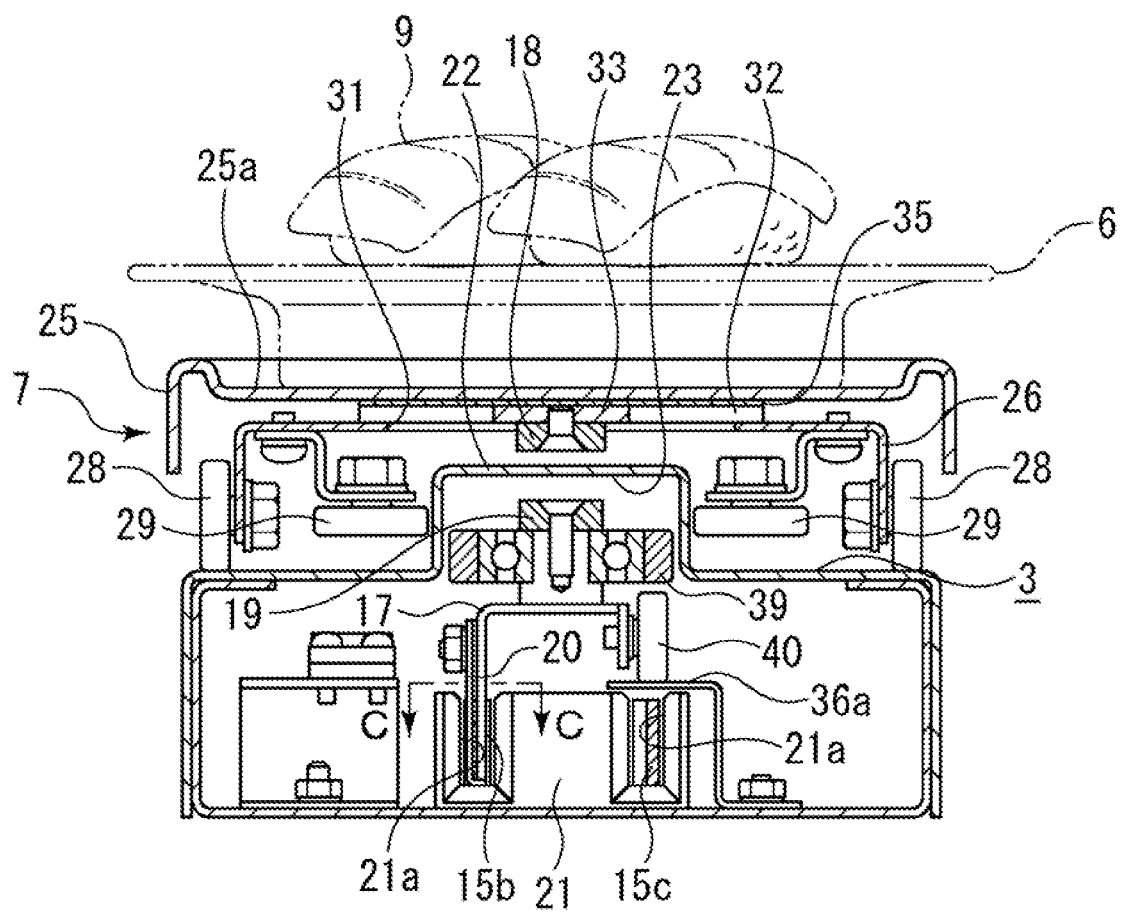
FIG. 7 is a cross-sectional diagram along A-A in FIG. 2.
Figure 8:
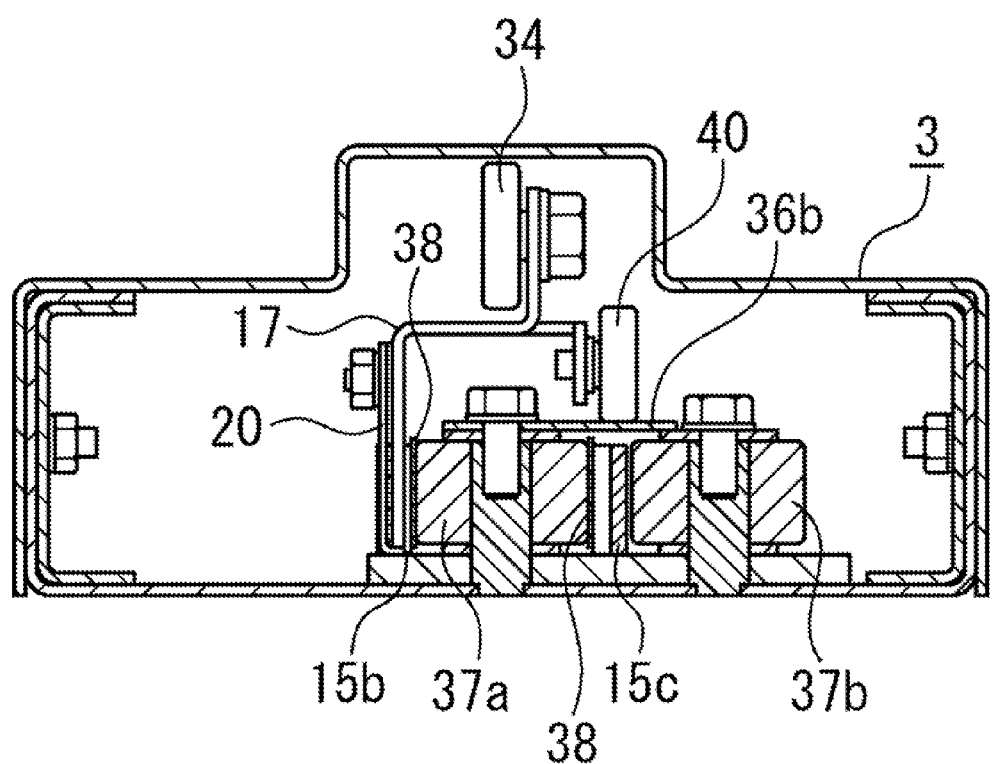
FIG. 8 is a cross-sectional diagram along B-B in FIG. 2.

The food and drink conveying device according to the first embodiment is described in reference to FIGS. 1 to 11. In the following descriptions, the left side of FIG. 5 is the front side of the travel body, the upper side of FIG. 6 is the front side of the travel body, and the direction perpendicular to the drawings when being looked at in FIGS. 7 and 8 is the front side of the travel body. In FIG. 1, 1 is the food and drink conveying device to which the present invention is applied. This food and drink conveying device 1 is provided with ordered item conveying paths 1a, 1b and 2, which are travel paths according to the present invention, that run in a kitchen area C where kitchen staff C1, C2 prepare sushi, which is an example of the food and drink, and in a customer area A where customers eat and drink in conveyor belt sushi restaurants.

A circulating conveying path 5 in rectangular loop form is provided along tables T1, T2, T3 and T4 in the customer area A so as to surround the ordered item conveying paths 1a, 1b and 2. The circulating conveying path 5 is provided with a crescent chain conveyor 4 that continuously rotates, and food and drink plates 6 on which food and drink are placed are continuously conveyed on this crescent chain conveyor 4 when the crescent chain conveyor 4 is driven.

In the conveyor belt sushi restaurants where this circulating conveying path 5 is provided, the customers can take the food and drink that are being conveyed on the circulating conveying path 5 to eat and drink and can place an individual order for food and drink that are not being conveyed on the circulating conveying path 5 with a server or through an ordering device, not shown.

In addition, individually ordered food and drink are placed on any of the ordered item conveying paths 1a, 1b and 2 within the kitchen area C after being prepared in the kitchen area C so as to be conveyed to the vicinity of the customer who placed the order.

Typically, when a customer in the customer area A places an order, the kitchen staff C1, C2 in the kitchen area C behind a partition W prepare the ordered food or drink 9 at a kitchen table 8a or 8b and place it on a food and drink plate 6 (see FIG. 7). After that, as described below, the food and drink plate 6 on which the ordered food or drink 9 is placed is placed on the travel body 7 that is provided so as to travel forwards and backwards freely over the conveyor surface 3 of the ordered item conveying paths 1a, 1b and 2.

Next, the ordered food or drink 9 placed on the travel body 7 is conveyed to the server area B through the ordered item conveying path 1a, 1b or 2. At this time, the ordered food or drink 9 that has been conveyed through the ordered item conveying path 1a or 1b can be directly picked up by the customer in the area G1, G2, G3 or G5, while the ordered food or drink 9 that has been conveyed through the ordered item conveying path 2 is conveyed to the server H1 so that the server H1 hands it to the customer in the area G4.

The travel body 9 that has conveyed the ordered food or drink 9 returns to the kitchen area C after passing over the same conveyor surface 3 through the ordered item conveying path 1a, 1b or 2. That is to say, the travel body 7 is provided so as to travel forwards and backwards freely between the server area B and the kitchen area C over the conveyor surface 3 along the ordered item conveying paths 1a, 1b and 2, which are formed as independent conveying paths.

Next, the three ordered item conveying paths 1a, 1b and 2 are described. As shown in FIG. 1, the ordered item conveying paths 1a, 1b and 2 are all provided so as to run straight from the kitchen area C towards the customer area A and pass through an opening, not shown, in the partition W. Within the kitchen area C, the ordered item conveying path 2 is provided at the center and the ordered item conveying paths 1a and 1b are provided on the left and right sides of the ordered item conveying path 2 in close proximity.

That is to say, the three ordered item conveying paths 1*a*, 1*b* and 2 are provided in close proximity so that an ordered food or drink can be efficiently placed on any of these ordered item conveying paths from the same place after being prepared.

Meanwhile, within the server area B in rectangular form as viewed from the top, the ordered item conveying path 2 is provided at the center so as to divide this server area B into two. The ordered item conveying paths 1*a* and 1*b* are bent in the vicinity of the partition W to the left and right so as to be away from the ordered item conveying path 2 at the center and then run straight towards the inside of the circulating conveying path 5. Furthermore, the ordered item conveying path 1*a* and 1*b* are bent in the point close to the inside of the circulating conveying path 5 and then run along the circulating conveying path 5 towards the area G4.

That is to say, a first corner 10*a* (curved right) and a second corner 11*a* (curved left), which are the curved paths according to the present invention, are formed in the ordered item conveying path 1*a* in the vicinity of the partition W, and a first corner 10*b* (curved left) and a second corner 11*b* (curved right), which are the curved paths according to the present invention, are formed in the ordered item conveying path 1*b* in the vicinity of the partition W, respectively.

In addition, in the sections of the ordered item conveying paths 1*a* and 1*b* between the kitchen area C and the first corners 10*a* and 10*b*, between the first corners 10*a* and 10*b* and the second corners 11*a* and 11*b*, and between the second corners 11*a* and 11*b* and the area G4, the ordered item conveying paths 1*a* and 1*b* are in a straight form as straight paths 12*a* and 12*b* as described above.

Next, the ordered item conveying paths 1*a*, 1*b* and 2 as well as the travel body 7 are described in detail. Though the ordered item conveying paths 1*a*, 1*b* and 2 are different in the shape, the structure for allowing the travel body 7 to travel is the same, and therefore only the ordered item conveying path 1*a* is described in the following, and the descriptions of the other ordered item conveying paths 1*b* and 2 are omitted. Furthermore, the state where the travel body 7 is in the corner 10*a* or 11*a* in the ordered item conveying path 1*a* and the state where the travel body 7 is in the corner 10*b* or 11*b* in the ordered item conveying path 1*b* are different only in the direction in which the below-described first magnetic body 18 moves, which is opposite to each other, and therefore only the state where the travel body 7 is in the first corner 10*a* in the ordered item conveying path 1*a* is described.

Figure 2:
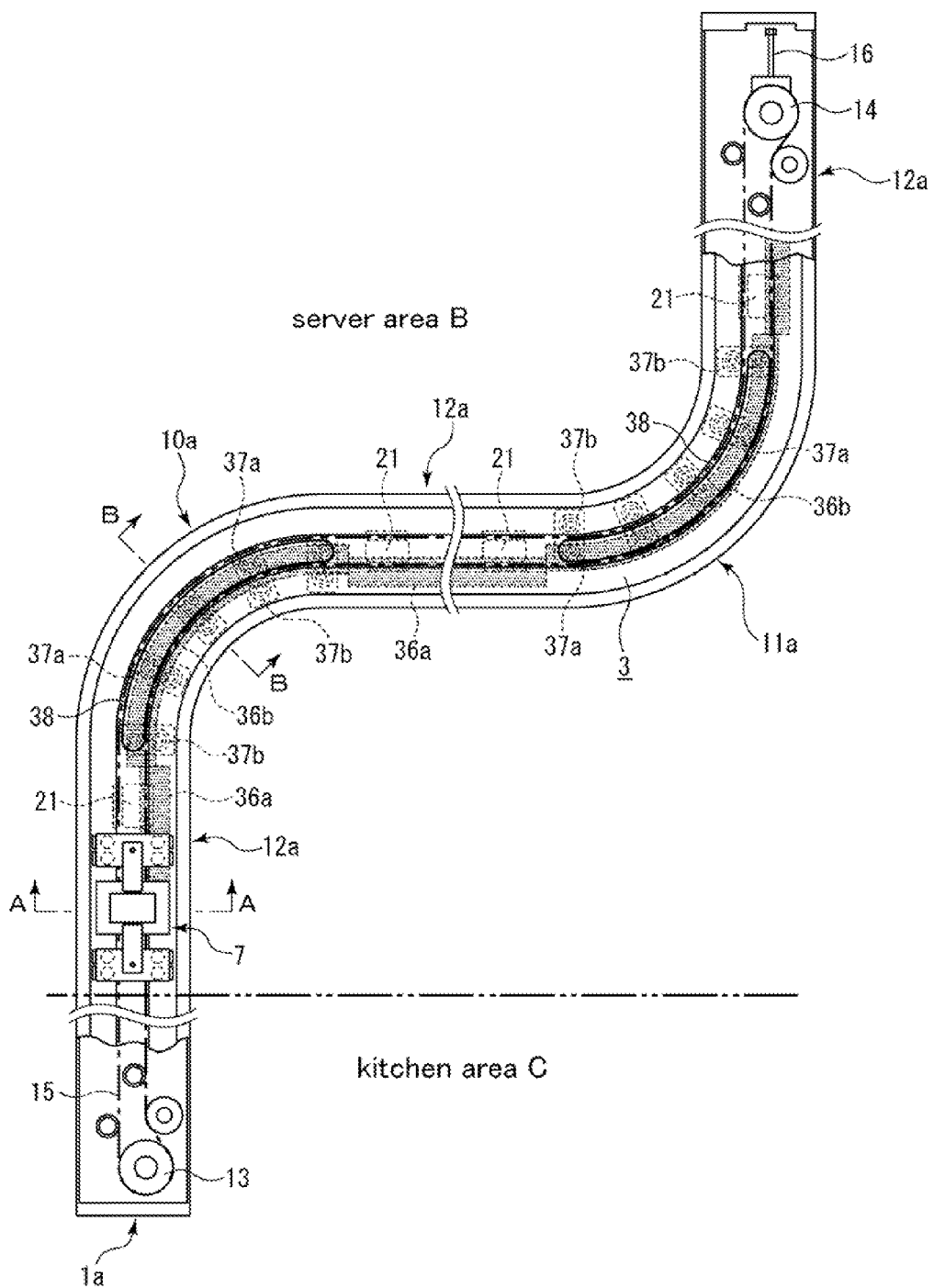
FIG. 2 is a plan diagram showing an ordered item conveying path with uncovered portions.

First, the structure of the ordered item conveying path 1*a* along which the travel body 7 travels is described. As shown in FIG. 2, a driving sprocket 13, which rotates in a plane by means of a driving motor, not shown, is provided at the end of the ordered item conveying path 1*a* on the kitchen area C side beneath the conveyor surface 3, and at the same time, a tension sprocket 14 is provided at the end of the ordered item conveying path 1*a* on the server area B side.

An annular driving belt 15, which is a conveyor driving body according to the present invention, goes around the driving sprocket 13 and the tension sprocket 14, which are provided at the two ends as described above. A number of protrusions 15*a* that can engage with the driving sprocket 13 and the tension sprocket 14 throughout the entirety of the driving belt 15 on the right side are formed on the inner surface of this driving belt 15.

These protrusions 15*a* engage with the driving sprocket 13 and the tension sprocket 14 so that the driving belt 15 is driven when the driving sprocket 13 rotates. As shown in FIGS. 2, 7 and 8, the driving sprocket 13 rotates clockwise in FIG. 2 so that the left side of this driving belt 15 is a forward-moving belt 15*b* that is driven from the kitchen area C to the server area B and the right side is a backward-moving belt 15*c* that is driven from the server area B to the kitchen area C when the driving belt 15 allows the travel body 7 on which food or drink is placed to travel from the kitchen area C to the server area B. Here, this tension sprocket 14 is provided with a tension adjusting portion 16 for providing tension to the driving belt 15.

Furthermore, the right side of this driving belt 15 is a forward-moving belt 15*b* that is driven from the kitchen area C to the server area B and the left side is a backward-moving belt 15*c* that is driven from the server area B to the kitchen area C when the driving belt 15 allows the travel body 7 to travel from the server area B to the kitchen area C after the food or drink has been taken in the server area B, and a case where the travel body 7 travels with food or drink placed on top from the kitchen area C to the server area B is described in the following.

The driving belt 15 is provided so that it can move along the conveyor surface 3 of the ordered item conveying path 1*a* beneath the conveyor surface 3 along which the travel body 7 travels. As shown in FIG. 7, the below-described belt brackets 17 are attached to predetermined portions of the forward-moving belt 15*b*. In addition, the driving belt 15 is guided by the below-described belt guides 21 and sliding rollers 37*a* and 37*b* along the entirety that includes the straight path 12*a*, the first corner 10*a* and the second corner 11*a* between the driving sprocket 13 and the tension sprocket 14.

Typically, as shown in FIGS. 2 and 7, belt guides 21 are provided at the end of the straight path 12*a* on the side towards which the driving belt 15 is driven. These belt guides 21 have two guide trenches 21*a* that have openings in the above and face the front and the rear on the left and right, and thus are formed in E shape that faces upward as viewed from the rear. The forward-moving belt 15*b* and the backward-moving belt 15*c* are contained within these guide trenches 21*a* so that these guide trenches 21*a* prevent the forward-moving belt 15*b* and the backward-moving belt 15*c* from swaying in the left and right directions.

In addition, a plate stands along the entirety of the straight path 12*a* on the right side of the backward-moving belt 15*c*. The upper end portion of this plate is bent horizontally above the backward-moving belt 15*c*, and thus a guide plate 36*a* is formed.

As shown in FIGS. 2 and 8, a number of sliding rollers 37*a* and 37*b*, which are sliding means according to the present invention, are provided in the first corner 10*a* so that the driving belt 15 can be slid in the direction in which the driving belt 15 is driven.

Typically, as shown in FIGS. 3 and 8, a number (five in the present embodiment) of sliding rollers 37*a* that make contact with the inner surface of the forward-moving belt 15*b* are provided on the outer side of the first corner 10*a* along the curve with the same curvature as the first corner 10*a*. Meanwhile, a number (five in the present embodiment) of sliding rollers 37*b* that make contact with the outer surface of the backward-moving belt 15*c* are provided on the inside of the first corner 10*a* along the curve with the same curvature as the first corner 10*a*. These sliding rollers 37*a* and 37*b* make pairs on the left and right so that each pair is supported in order to be pivotable in a plane. A guide plate 36*b* having the same curvature as the first corner 10*a* is attached to a portion above the sliding rollers 37*a*. This guide plate 36*b* is attached so that the upper surface continues to the upper surface of the guide plates 36*a* in the straight path 12*a* that are provided before and after the first corner 10*a*.

In addition, as shown in FIGS. 2 and 3, a looped sub-belt 38 made of a rubber material goes around the sliding rollers 37*a* provided in the first corner 10a so as to intervene between the forward-moving belt 15b and the sliding rollers 37a, and thus the forward-moving belt 15b and the sliding rollers 37a can be prevented from making contact with each other, which would generate abnormal sounds, and at the same time, the protrusions 15a can be prevented from being worn down.

Though in the present embodiment the sub-belt 38 goes around the sliding rollers 37a provided on the outer side the first corner 10a as described above, the sub-belt 38 may go around the sliding rollers 37b in addition to the sliding rollers 37a or the sub-belt 38 may go around only the sliding rollers 37b.

Furthermore, the second corner 11a has the same structure as the first corner 10a, except that the forward-moving belt 15b makes contact with the sliding rollers 37b that are provided on the inner side and the backward-moving belt 15c makes contact with the sliding rollers 37a that are provided on the outer side, and therefore the descriptions thereof are omitted.

As shown in FIG. 7, a protruding rail 22 is provided at the center of the conveyor surface 3 along the entirety of the ordered item conveying path 1a. Typically, the conveyor surface 3 is formed of a metal plate, such as of aluminum or stainless steel. The rail 22 is formed of this metal plate by applying pressure, and therefore a conveyor trench 23 in C shape that faces downward, as viewed in a cross-section, is created on the lower side of the plate from which the rail 22 is formed.

Next, the travel body 7 is described in reference to FIGS. 4 to 7. As shown in FIG. 4, the travel body 7 is formed of a carriage 24 that travels over the conveyor surface 3 and a tray 25 that is attached to this carriage 24 from the top and on which a food and drink plate 6 on which an ordered food or drink 9 is placed is to be placed. A recess 25a in which a food and drink plate 6 is placed is created on top of this tray 25, and this recess 25a can hold the food and drink plate 6 so that the food and drink plate 6 can be prevented from falling off the tray 25 when the food and drink plate 6 is placed in this recess 25a.

The carrier 24 is mainly formed of a base 26, which is the travel body main unit according to the present invention, and roller brackets 27 that are attached to the two locations, at the front end and the rear end, of this base 26. As shown in FIGS. 4 and 5, these roller brackets 27 are formed of a wide, rectangular horizontal plate 27a, as viewed from the top, and vertical plates 27b that run downward from the left and right ends of this horizontal plate 27a, and thus are in C shape facing downward.

Load supporting rollers 28 are attached to the outside of the two vertical plates 27b so as to be pivotable and so that the travel body 7 can travel over the conveyor surface 3. In addition, two pairs, one on the left and one on the right, of orbital rollers 29, front and rear, are attached between the two vertical plates 27b so as to be pivotable in a horizontal plane as the contact sections and the rotatable bodies according to the present invention. Typically, these orbital rollers 29 are supported so as to be pivotable within the space surrounded by the horizontal plate 27a and the two vertical plates 27b and so as to be symmetrical between the left and right sides.

Furthermore, as shown in FIG. 7, the distance between the left and right orbital rollers 29 is slightly greater than the width of the rail 22 of the conveyor surface 3 so that the orbital rollers 29 at the front and rear ends of the travel body 7 are in close proximity to the rail 22 on the left and right sides when the travel body 7 is placed on the conveyor surface 3.

As described above, the orbital rollers 29 at the front and rear ends of the travel body 7 are located on the left and right sides of the rail 22 so that the travel body 7 is regulated along the travel path over the conveyor surface 3, and in addition, the orbital rollers 29 make contact with the rail 2 in order to prevent the travel body 7 from swaying to the left and right.

As shown in FIG. 6, the roller brackets 27 are supported by axes 30, which are provided on the center line L that divides the carriage 24 into two widthwise, at the front and rear ends of the carriage 24 so as to be pivotable in a horizontal plane. That is to say, the roller bracket 27 that is supported by the axis 30 at the front end of the carriage 24 so as to be pivotable in a horizontal plane forms the leading body according to the present invention, and the roller bracket 27 that is supported by the axis 30 at the rear end of the carriage 24 so as to be pivotable in a horizontal plane forms the following body according to the present invention.

In addition, a long hole 31 is provided at approximately the center of the base 26 as viewed from the top so as to be oriented along the width and penetrate the carriage 24 in the upward/downward direction. Guide pieces 32 that are oriented along the width are provided in the front and at the rear of the long hole 31 on the upper surface of the base 26. These guide pieces 32 are arranged so as to be parallel to the long hole 31 and have approximately the same length as the long hole 31.

In addition, a sliding piece 33 that is approximately in square form as viewed from the top is placed between the front and rear guide pieces 32. The length of this sliding piece 33 between the front and rear is approximately the same as the distance between the front and rear guide pieces 32 so that the front and the rear of this sliding piece 33 are guided by the two guide pieces 32, and thus the sliding piece 33 is slidable to the left and right above the long hole 31.

A first magnetic body 18, which is a linking means according to the present invention, is attached to the lower surface of this sliding piece 33. This first magnetic body 18 can slide in the width direction as the sliding piece 33 slides above the long hole 31. Here, the range in which the first magnetic body 18 can move in the width direction is regulated by the left and right ends of the inner wall of the long hole 31 with which the first magnetic body 18 can make contact. In addition, as shown in FIG. 5, the long hole 31 and the sliding piece 33 are covered, as viewed from the top, by a support plate 35 for supporting the tray 25 from the bottom, which is attached over the front and rear guide pieces 32, so that the tray 25 can be attached to the carriage 24.

Figure 10:
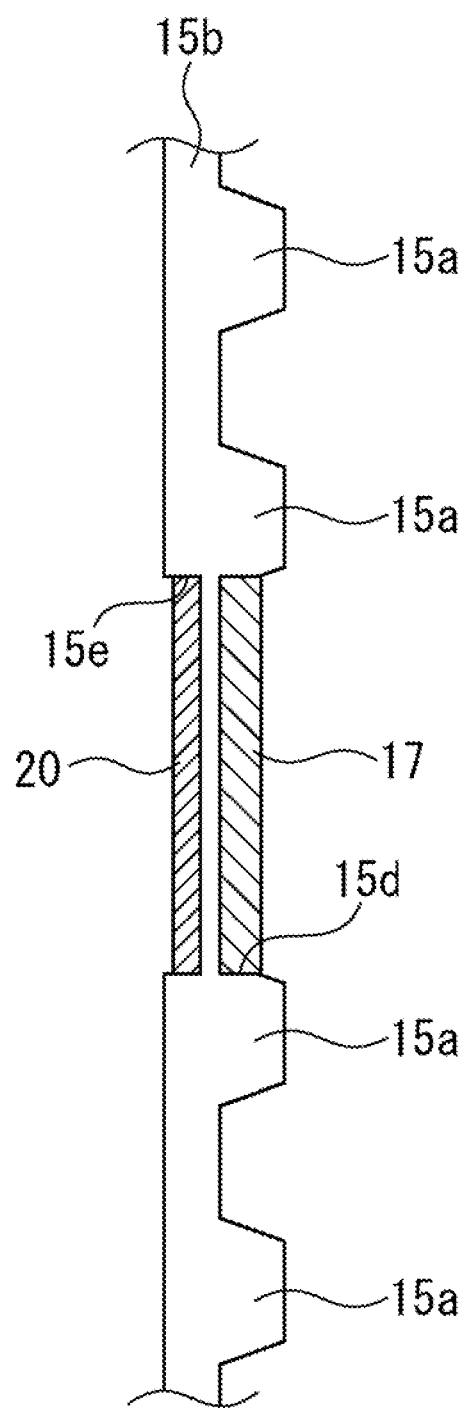
FIG. 10 is a cross-sectional diagram along C-C in FIG. 7.

As shown in FIGS. 7, 8 and 10, the below-described belt bracket 17, which is a connection portion according to the present invention, is attached to the forward-moving belt 15b as described above. Typically, the belt bracket 17 forms the connection portion according to the present invention and is in approximately L shape as viewed from the rear. In addition, an inside container recess 15d that has an opening facing inward is created in a predetermined portion on the inside (right side) of the forward-moving belt 15b, and an outside container recess 15e that has an opening facing outward is created on the outer side (left side) of the forward-moving belt 15b so as to be on the opposite side of the inside container recess 15d.

The inside container recess 15d and the outside container recess 15e penetrate in the front/rear direction, and at the same time, the lower end of the belt bracket 17 is contained in the inside container recess 15d. Meanwhile, the lower portion of a support plate 20 for attaching the belt bracket 17 to the forward-moving belt 15b is contained in the outer container recess 15e.

As shown in FIGS. 7 to 9(b), the belt bracket 17 and the support plate 20 are fastened to each other by a nut and bolt in the direction of the width above the driving belt 15 so that the lower ends of the belt bracket 17 and the support plate 20 hold the driving belt 15 from the two sides. Furthermore, the lower end of the support plate 20 is bent towards the bottom of the belt bracket 17.

As a result, the driving belt 15 is surrounded by the support plate 20 and the belt bracket 17 from the left, right and bottom, and therefore the attachment of the belt bracket 17 to the driving belt 15 can be maintained. That is to say, the belt bracket 17 forms part of the linking means together with a second magnetic body 19 in the present embodiment.

In addition, a second magnetic body 19 made of a metal having ferromagnetism or a permanent magnet, which is the linking means according to the present invention, is secured to the upper end of this belt bracket 17. Furthermore, a regulating roller 39, which rotates around the second magnetic body 19 in a horizontal plane and is the movement regulating means according to the present invention, is supported around the second magnetic body 19, and the second magnetic body 19 and the regulating roller 39, which are located at the upper end of the belt bracket 17, are placed in the above-described conveyor trench 23. Moreover, the second magnetic body 19 moves along approximately the entirety of the ordered item conveying path 1a in the conveyor trench 23 when the driving belt 15 is driven.

One of the second magnetic body 19 provided beneath the conveyor surface 3 and the first magnetic body 18 attached to the travel body 7 may be made of a ferromagnetic metal and the other may be made of a permanent magnet, or the two may be made of a permanent magnet. In the case where the two are made of a permanent magnet, the different magnet poles face each other with the conveyor surface 3 in between.

Figure 9A:
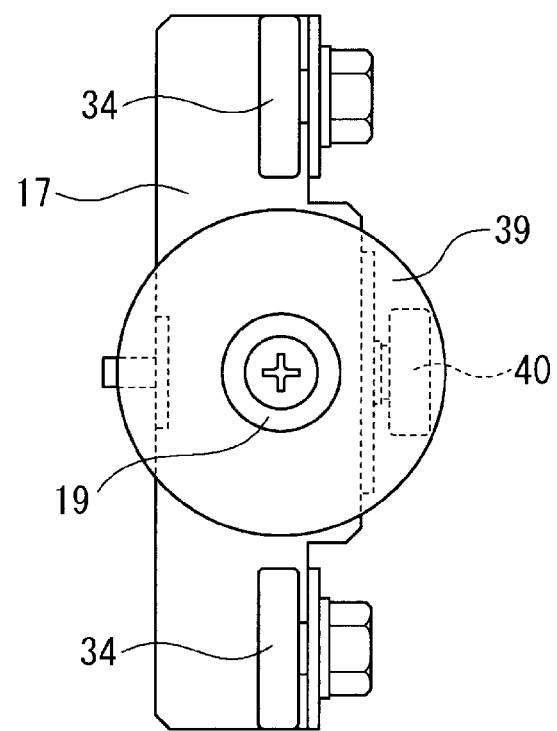
FIG. 9(a) is a plan diagram showing a belt bracket.
Figure 9B:
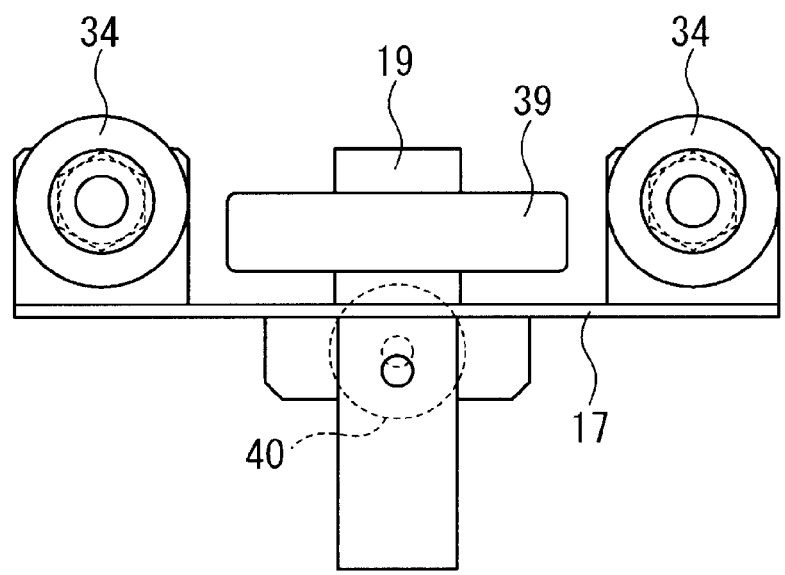
FIG. 9(b) is a side diagram showing a belt bracket.

As shown in FIGS. 8 to 9(b), a pair of guide rollers 34 that make contact with the upper surface within the conveyor trench 23 is provided to the upper end of the belt bracket 17 in such a manner that one is in front of the second magnetic body 19 and the other is to the rear of the second magnetic body 19.

Typically, these guide rollers 34 are supported by the belt bracket 17 so as to be pivotable in such a direction that the driving belt 15 can travel forwards or backwards so that the guide rollers 34 can travel together with the driving belt 15 when the driving belt 15 is driven. When the first magnetic body 18 and the second magnetic body 19, which face each other with the conveyor surface 3 in between, are attracted to each other, the second magnetic body 19 makes contact with the lower surface of the plate of which the upper surface is the conveyor surface 3 so that the driving belt 15 is prevented from being lifted upwards. That is to say, these guide rollers 34 form the lift preventing means according to the present invention.

In addition, an auxiliary roller 40 for supporting the load of the belt bracket 17 is supported by the right side portion of the belt bracket 17 so as to be pivotable in such a direction that the driving belt 15 can travel forwards or backwards. This auxiliary roller 40 makes contact on the upper surface of the guide plates 36a and 36b so that the load of the second magnetic body, the regulating roller 39 and the belt bracket 17 can be supported when they travel over the upper surface of the guide plates 36a and 36b when the driving belt 15 is driven. That is to say, the guide plates 36a, 36b and the auxiliary roller 40 form the support means according to the present invention.

The ordered item conveying path 1a and the travel body 7 are formed as described above, and thus when the driving belt 15 is driven, the travel body 7 to which the first magnetic body 18 connected to the second magnetic body 19 through a magnetic force is attached can travel over the conveyor surface 3 along the ordered item conveying path 1a.

Next, the operation of the travel body 7 that travels over the conveyor surface 3 is described. First, as shown in FIG. 6, the first magnetic body 18 faces the second magnetic body 19 that moves in the conveyor trench 23 along the straight path 12a of the ordered item conveying path 1a, and therefore the first magnetic body 18 is located at approximately the center of the long hole 31, which is along the center line L that connects the front and rear axes 30.

Figure 11:
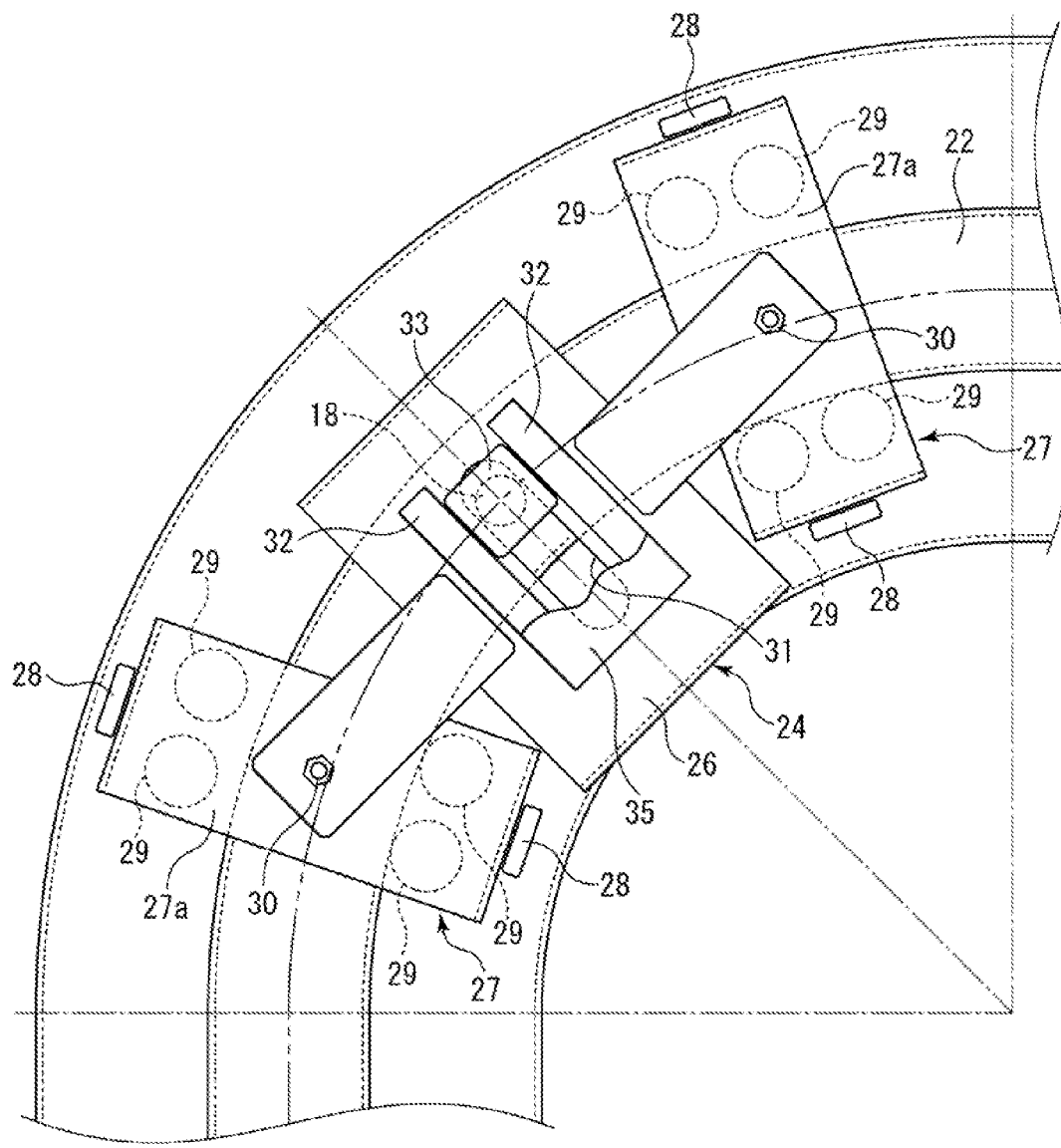
FIG. 11 is a plan diagram showing a travel body in the first corner of an ordered item conveying path.

As shown in FIG. 11, when the travel body 7 enters the first corner 10a, the two roller brackets 27 start rotating around the axes 30 so as to follow the form of the rail 22 in the first corner 10a. When the two roller brackets 27 rotate, the orbital rollers 29 on the front side of the two pairs, front and rear, of the orbital rollers 29 on the inner side of the first corner 10a start making contact with the rail 22. Furthermore, as the two roller brackets 27 rotate around the axes 30, the orbital rollers 29 on the rear side of the two pairs, front and rear, of the orbital rollers 29 in the two roller brackets 27 make contact with the rail 22, and as a result, further rotation of the two roller brackets 27 around the axes 30 is regulated when the two orbital rollers 29 in each pair at the front and rear make contact with the rail 22.

When the travel body 7 travels around the first corner 10a and there is a difference in the amount of rotation between the front roller bracket 27 and the rear roller bracket 27, there is a difference in the track between the front roller and the rear roller of the travel body 7, and therefore the center line L of the travel body 7 has a locus that is more inside the first corner 10a than the locus of the second magnetic body 19 (two-dotted chain line in FIG. 8).

At this time, the first magnetic body 18 is connected to the second magnetic body 19 through a magnetic force, and therefore the first magnetic body 18 moves towards the outer side of the first corner 10a within the long hole 31 so as to maintain the position relative to the second magnetic body 19 when the travel body 7 travels around the first corner 10a with the center line L being shifted towards the inside of the first corner 10a. That is to say, the first magnetic body 18 can move so as to follow the second magnetic body 19 when the travel body 7 travels.

At this time, the second magnetic body 19 receives force directed towards the inside of the first corner 10a, which is a direction perpendicular to the direction in which the driving belt 15 is driven, from the first magnetic body 18 when the first magnetic body 18 moves toward the outer side of the first corner 10a. However, the regulating roller 39 makes contact with the inner side of the conveyor trench 23 so that the second magnetic body 19 can be regulated from moving towards the inside of the first corner 10a. Though the regulating roller 39 is made to make contact with the inner surface of the conveyor trench 23 so that the second magnetic body 19 is regulated from moving in the present embodiment, a synthetic resin material having a small friction is attached to the inside of the conveyor trench 23 so that the second magnetic body 19 can make contact with this synthetic resin material, and thus the second magnetic body 19 can be regulated from moving towards the inside of the first corner 10.

When the travel body 7 again enters into the straight path 12a from the first corner 10a, the travel body 7 travels so that the center line L of the travel body 7 is located above the center of the rail 22, and therefore the first magnetic body 18 moves towards the center of the long hole 31 within the long hole 31.

As described above, the first magnetic body 18 attached to the travel body 7 moves so as to follow the second magnetic body 19, and therefore the state where the second magnetic body 19 and the first magnetic body 18 are connected can be maintained, and thus the travel body 7 can travel stably even when there is a difference between the orbits through which the travel body 7 and the driving belt 15 travel.

As described above, the food and drink conveying device 1 according to the present embodiment is provided with: an ordered item conveying path 1a; a driving belt 15 provided beneath the ordered item conveying path 1a along the ordered item conveying path 1a; and a travel body 7 having a first magnetic body 18 underneath that can travel over the ordered item conveying path 1a with ordered food or drink 9 placed on top, wherein a second magnetic body 19 having a polarity opposite to that of the first magnetic body 18 is connected to an upper portion of the driving belt 15 beneath the ordered item conveying path 1a with a belt bracket 17 provided in between, and the travel body 7 travels over the ordered item conveying path 1a as a result of the magnetic force between the first magnetic body 18 and the second magnetic body 19 when the driving belt 15 is driven. The food and drink conveying device 1 is provided with a lift preventing means for preventing the second magnetic body 19 from being lifted due to the magnetic force between the first magnetic body 18 and the second magnetic body 19 in the vicinity of the second magnetic body 19 in such a manner that the lift preventing means makes contact with the ordered item conveying path 1a and moves together with the driving belt 15, and thus the second magnetic body 19 can be prevented from being lifted towards the first magnetic body 18 due to the magnetic force acting between the first magnetic body 18 and the second magnetic body 19 when the lift preventing means makes contact with the ordered item conveying path 1a. When the driving belt 15 is driven, the second magnetic body 19 does not make contact with the ordered item conveying path 1a, thus preventing friction from being generated between the second magnetic body 19 and the ordered item conveying path 1a, and therefore the travel body 7 can travel stably over the ordered item conveying path 1a.

In addition, the lift preventing means is formed of a pair of guide rollers 34 that make contact with the ordered item conveying path 1a and rotate so that the lift preventing means moves in the direction in which the driving belt 15 is driven. The pair of guide rollers 34 are aligned in the direction in which the driving belt 15 is driven, and the second magnetic body 19 is provided between the pair of guide rollers 34, and therefore the pair of guide rollers 34 that make contact with the ordered item conveying path 1a rotate while maintaining contact when the driving belt 15 is driven, and thus the friction generated between the ordered item conveying path 1a and the pair of guide rollers 34 can be kept small. In addition, the second magnetic body 19 is provided between the pair of guide rollers 34 that are aligned in the direction in which the driving belt 15 is driven so that only one of the two ends of the second magnetic body 19 that face in the direction in which the driving belt 15 is driven can be prevented from being lifted.

In addition, an auxiliary roller 40 for supporting the belt bracket 17 for connecting the second magnetic body 19 to the driving belt 15 and the guide plates 36a, 36b are provided along the ordered item conveying path 1a, and therefore the load of the second magnetic body 19 and the driving belt 15 can be supported by the auxiliary roller 40 and the guide plates 36a and 36b with the belt bracket 17 in between, and thus the travel body 7 can travel over the ordered item conveying path 1a in such a state that the connection between the first magnetic body 18 and the second magnetic body 19 due to the magnetic force is stable.

In addition, the first magnetic body 18 is provided to the travel body 7 so as to be movable in the direction perpendicular to the direction in which the travel body 7 travels, and at least either the second magnetic body 19 or the ordered item conveying path 1a is provided with a regulating roller 39 for regulating the movement of the second magnetic body 19 in the direction perpendicular to the direction in which the driving belt 15 is driven, and therefore when the travel body 7 moves in the direction away from the driving belt 15, the first magnetic body 18 follows the second magnetic body 19 so that the connection between the first magnetic body 18 and the second magnetic body 19 due to the magnetic force can be maintained without being reduced, and thus the travel body 7 can travel stably over the ordered item conveying path 1a.

Second Embodiment

Figure 12:
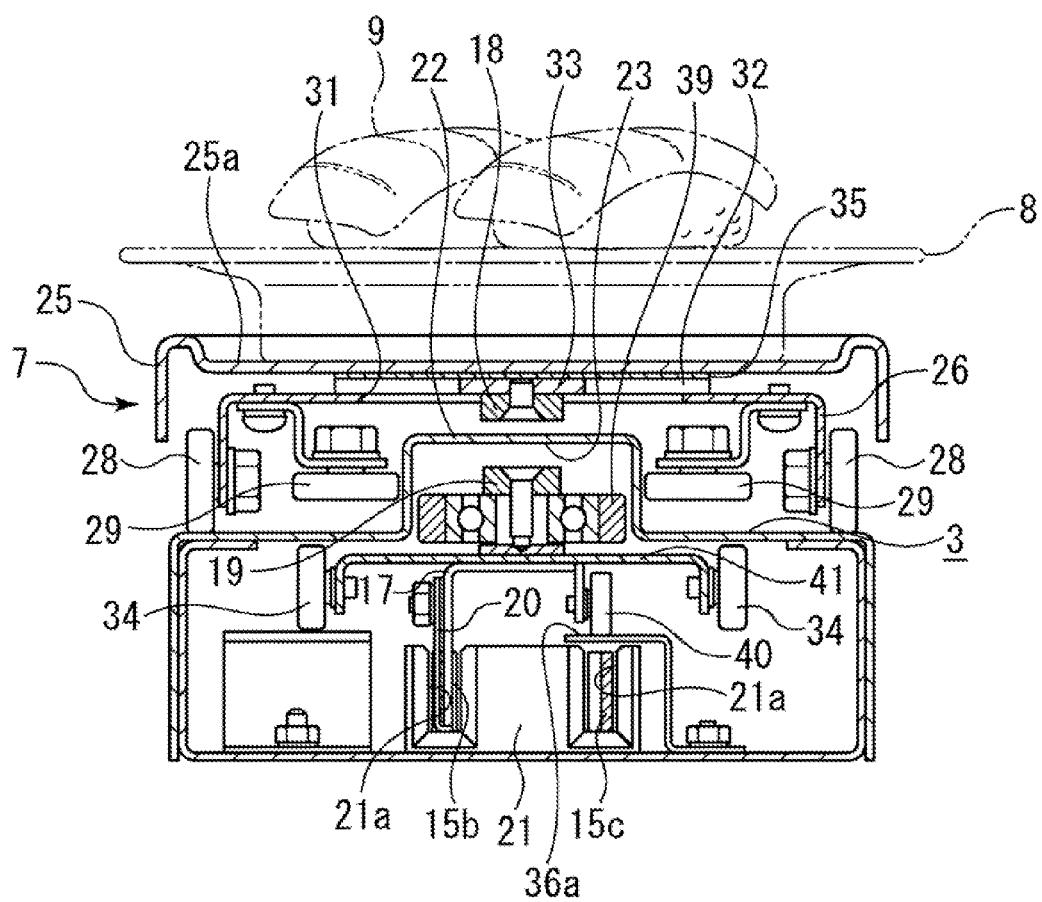
FIG. 12 is a cross-sectional diagram showing a straight path of the ordered item conveying path in the second embodiment.
Figure 13A:
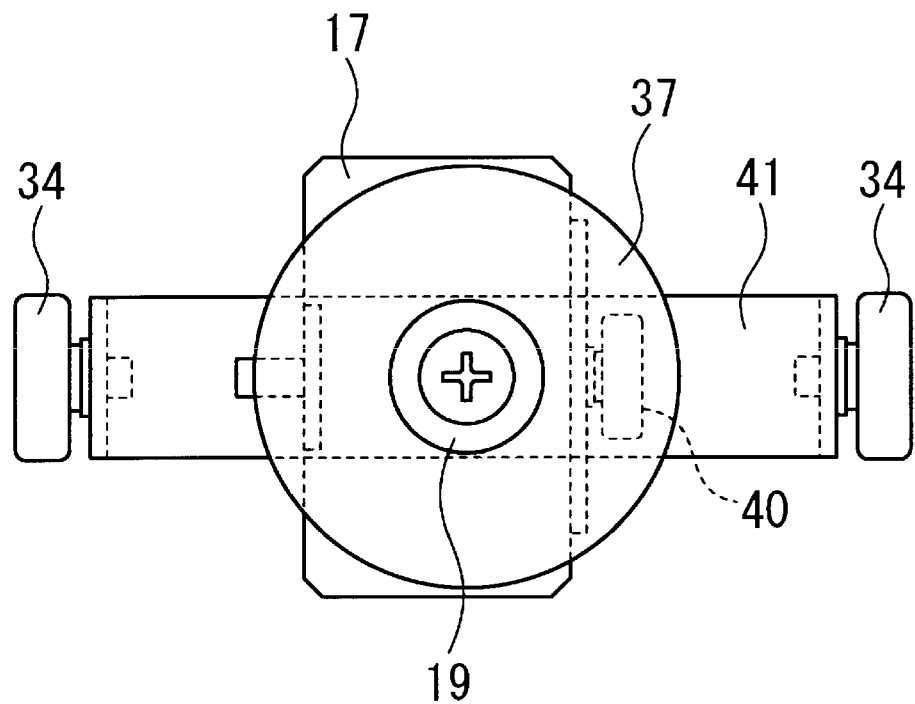
FIG. 13(a) is a plan diagram showing a belt bracket.
Figure 13B:
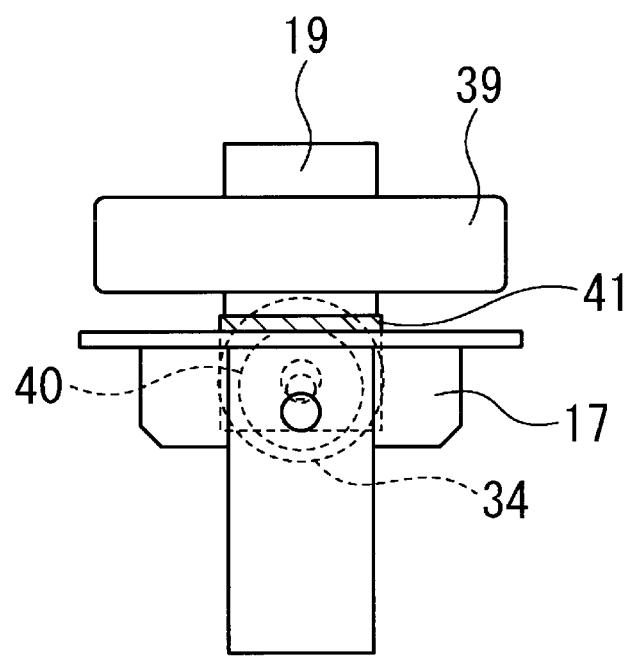
FIG. 13(b) is a side diagram showing a belt bracket.

Next, the food and drink conveying device according to the second embodiment is described in reference to FIGS. 12 to 13(b). Here, the descriptions of the same components as in the above-described embodiment are omitted. In the following descriptions, the direction perpendicular to the drawings when being looked at in FIG. 12 is the front side of the travel body.

As shown in FIGS. 12 to 13(b), a pair of contact guide rollers 34, one being to the left and the other being to the right of the second magnetic body 19 and which are the lift preventing means according to the present invention, are provided in the upper portion of the belt bracket 17 beneath the plate of which the upper surface is the conveyor surface 3 to the sides of the conveyor trench 23.

Typically, a support bracket 41 oriented in the direction of the width is attached to the upper portion of the belt bracket 17. The pair of guide rollers 34 are supported by the sides of this support bracket 41 so as to be rotatable in such a manner that the belt bracket 17 moves in the direction in which the driving belt 15 is driven. These guide rollers 34 are formed so as to make contact with the bottom of the plates of which the upper surface is the conveyor surface 3 when the first magnetic body 18 and the second magnetic body 19, which are provided so as to face each other with the conveyor surface 3 in between, attract to each other, and thus prevent the driving belt 15 from being lifted upwards.

As described above, in the food and drink conveying device 1 according to the second embodiment, the lift preventing means is formed of a pair of guide rollers 34 that make contact with the ordered item conveying path 1a and rotate so that the belt bracket 17 moves in the direction in which the driving belt 15 is driven. The pair of guide rollers 34 are aligned in the direction perpendicular to the direction in which the driving belt 15 is driven and the second magnetic body 19 is arranged between the pair of guide rollers 34, and therefore the pair of guide rollers 34 that make contact with the ordered item conveying path 1a rotate while maintaining contact when the driving belt 15 is driven, and thus the friction generated between the ordered item conveying path 1a and the pair of guide rollers 34 can be kept small. In addition, the second magnetic body 19 is arranged between the pair of guide rollers 34 that are aligned in the direction perpendicular to the direction in which the driving belt 15 is driven, and thus only one of the two ends of the second magnetic body 19 that face in the direction perpendicular to the direction in which the driving belt 15 is driven can be prevented from being lifted.

As described above, the embodiments of the present invention are described in reference to the drawings, but the structure of the invention is not limited to these embodiments, and modifications and additions are also included in the scope of the present invention as long as the gist of the present invention is not deviated from.

For example, the above embodiments are described when the food and drink are those that can be served in a sushi restaurant, but the invention is not limited to this and can be applied to various foods and drinks.

In addition, the food and drink conveying device 1 according to the above-described embodiments is a device for conveying an ordered food or drink 9 that has been ordered by a customer, but it may be a continuously conveying device for continuously conveying food or drink that has been prepared in advance between the kitchen area C and the customer area A.

In addition, though in the above-described embodiment an auxiliary roller 40 is supported by the belt bracket 17 so as to be pivotable and this auxiliary roller 40 can travel over the upper surface of the guide plates 36a and 36b so that the load of the second magnetic body, the regulating roller 39 and the belt bracket 17 is supported, at least the guide plate 36b can be formed of a synthetic resin material having little friction so that the friction generated between the auxiliary roller 40 and the guide plate 36b can be kept small when the auxiliary roller 40 travels above the guide plate 36b in the first corner 10a or in the second corner 11a, and thus abnormal sound can be prevented from being made.

EXPLANATION OF SYMBOLS 1 food and drink conveying device
1a, 1b, 2 ordered item conveying path (travel path)
7 travel body
9 ordered food or drink
10a, 10b first corner
11a, 11b second corner
12a, 12b straight path
15 driving belt (conveyor driving body)
15a protrusion
15b forward-moving belt
15c backward-moving belt
15d inside container recess
17 belt bracket (connection portion, linking means)
18 first magnetic body (linking means)
19 second magnetic body (linking means)
26 base (travel body main unit)
27 roller bracket (leading body, following body)
29 orbital roller (contact section, rotational body)
34 guide roller (lift preventing means)
36a, 36b guide plate (support means)
37a, 37b sliding roller (sliding means)
38 sub-belt
39 regulating roller (movement regulating means)
40 auxiliary roller (support means)

The invention claimed is:

1. A food and drink conveying device, comprising:
a travel path;
a conveyor driving body provided beneath the travel path along the travel path; and
a travel body having a first magnetic body underneath said travel body, said first magnetic body being positioned to travel over said travel path with food or drink placed on top of said travel body, wherein
a second magnetic body having a polarity opposite to that of said first magnetic body is connected to an upper portion of said conveyor driving body beneath said travel path with a connection portion provided between, whereby said travel body travels over said travel path as a result of magnetic force between said first magnetic body and said second magnetic body when said conveyor driving body is driven,
a lift preventing means for preventing said second magnetic body from being lifted due to the magnetic force between said first magnetic body and said second magnetic body, which moves together with said conveyor driving body, is provided in a vicinity of said second magnetic body so as to make contact with said travel path,
said lift preventing means comprises a pair of rollers which make contact with said travel path and rotate so that said lift preventing means move together with said conveyor driving body,
the pair of rollers are aligned in a direction in which said conveyor driving body is driven, and
said second magnetic body is provided between said pair of rollers.

2. A food and drink conveying device, comprising:
a travel path;
a conveyor driving body provided beneath the travel path along the travel path; and
a travel body having a first magnetic body underneath said travel body, said first magnetic body being positioned to travel over said travel path with food or drink placed on top of said travel body, wherein
a second magnetic body having a polarity opposite to that of said first magnetic body is connected to an upper portion of said conveyor driving body beneath said travel path with a connection portion provided between, whereby said travel body travels over said travel path as a result of magnetic force between said first magnetic body and said second magnetic body when said conveyor driving body is driven,
a lift preventing means for preventing said second magnetic body from being lifted due to the magnetic force between said first magnetic body and said second magnetic body, which moves together with said conveyor driving body, is provided in a vicinity of said second magnetic body so as to make contact with said travel path,
said lift preventing means comprises a pair of rollers which make contact with said travel path and rotate so that said lift preventing means move together with said conveyor driving body,
the pair of rollers are aligned in a direction perpendicular to a direction in which said conveyor driving body is driven, and
said second magnetic body is provided between said pair of rollers.

3. A food and drink conveying device, comprising:
a travel path;
a conveyor driving body provided beneath the travel path along the travel path; and
a travel body having a first magnetic body underneath said travel body, said first magnetic body being positioned to travel over said travel path with food or drink placed on top of said travel body, wherein
a second magnetic body having a polarity opposite to that of said first magnetic body is connected to an upper portion of said conveyor driving body beneath said travel path with a connection portion provided between, whereby said travel body travels over said travel path as a result of magnetic force between said first magnetic body and said second magnetic body when said conveyor driving body is driven, and
a lift preventing means for preventing said second magnetic body from being lifted due to the magnetic force between said first magnetic body and said second magnetic body, which moves together with said conveyor driving body, is provided in a vicinity of said second magnetic body so as to make contact with said travel path, and further comprising a support means for supporting said connection portion for connecting said second magnetic body to said conveyor driving body provided along said travel path.

4. A food and drink conveying device, comprising:

a travel path;

a conveyor driving body provided beneath the travel path along the travel path; and a travel body having a first magnetic body underneath said travel body, said first magnetic body being positioned to travel over said travel path with food or drink placed on top of said travel body, wherein a second magnetic body having a polarity opposite to that of said first magnetic body is connected to an upper portion of said conveyor driving body beneath said travel path with a connection portion provided between, whereby said travel body travels over said travel path as a result of magnetic force between said first magnetic body and said second magnetic body when said conveyor driving body is driven, a lift preventing means for preventing said second magnetic body from being lifted due to the magnetic force between said first magnetic body and said second magnetic body, which moves together with said conveyor driving body, is provided in a vicinity of said second magnetic body so as to make contact with said travel path, and said first magnetic body is provided to said travel body so as to be movable in a direction perpendicular to a direction in which said travel body travels, and at least one of said second magnetic body and said travel path is provided with a movement regulating means for regulating the movement of said second magnetic body in the direction perpendicular to the direction in which said conveyor driving body is driven.

5. The food and drink conveying device according to claim 1, further comprising a support means for supporting said connection portion for connecting said second magnetic body to said conveyor driving body provided along said travel path.

6. The food and drink conveying device according to claim 2, further comprising a support means for supporting said connection portion for connecting said second magnetic body to said conveyor driving body provided along said travel path.

7. The food and drink conveying device according to claim 1, wherein said first magnetic body is provided to said travel body so as to be movable in a direction perpendicular to a direction in which said travel body travels, and at least one of said second magnetic body and said travel path is provided with a movement regulating means for regulating the movement of said second magnetic body in the direction perpendicular to the direction in which said conveyor driving body is driven.

8. The food and drink conveying device according to claim 2, wherein said first magnetic body is provided to said travel body so as to be movable in a direction perpendicular to a direction in which said travel body travels, and at least one of said second magnetic body and said travel path is provided with a movement regulating means for regulating the movement of said second magnetic body in the direction perpendicular to the direction in which said conveyor driving body is driven.

9. The food and drink conveying device according to claim 3, wherein said first magnetic body is provided to said travel body so as to be movable in a direction perpendicular to a direction in which said travel body travels, and at least one of said second magnetic body and said travel path is provided with a movement regulating means for regulating the movement of said second magnetic body in the direction perpendicular to the direction in which said conveyor driving body is driven.

* * * * *